United States Patent [19]

Harkey, Sr.

[11] Patent Number: 5,059,287
[45] Date of Patent: Oct. 22, 1991

[54] PORTABLE WATER DISTILLER

[75] Inventor: Charles W. Harkey, Sr., 7155 Roswell Rd., Atlanta, Ga. 30328

[73] Assignees: Charles W. Harkey, Sr.; Trac International Corp., both of Atlanta, Ga.

[21] Appl. No.: 367,305

[22] Filed: Jun. 16, 1989

[51] Int. Cl.⁵ .................. B01D 1/02; B01D 3/00; B01D 3/42

[52] U.S. Cl. .................. 203/1.000; 122/4 A; 122/13.1; 122/360; 159/28.4; 202/160; 202/181; 202/185.5; 202/185.6; 202/206; 202/242; 202/267.1; 203/2; 203/10; 203/86; 203/100; 392/394

[58] Field of Search .......... 203/10, 100, DIG. 17, 203/1, DIG. 18, 2, 86; 202/185.5, 242, 185.6, 181, 206, 267.1, 160; 159/28.4, DIG. 41, 44, 47.1; 122/4 A, 13 A, 360 A, 360 R; 392/394, 401, 402, 403

[56] References Cited

U.S. PATENT DOCUMENTS

| | | | |
|---|---|---|---|
| 1,902,842 | 3/1933 | Eaton | 219/287 |
| 2,480,053 | 8/1949 | Schubert | 219/312 |
| 2,847,549 | 8/1958 | Schmitt et al. | 219/275 |
| 3,090,857 | 5/1963 | Oberg | 219/275 |
| 3,278,395 | 10/1966 | Rubinowitz | 203/10 |
| 3,312,600 | 4/1967 | Morton | 203/10 |
| 3,350,279 | 10/1967 | Tolchin | 202/83 |
| 3,357,897 | 12/1967 | Salzer | 202/234 |
| 3,436,315 | 4/1969 | Ackerman | 203/10 |
| 3,687,817 | 8/1972 | Vimmerson et al. | 203/10 |
| 3,830,705 | 8/1974 | Dewegeli | 203/10 |
| 3,935,077 | 1/1976 | Dennison | 202/83 |
| 3,980,526 | 9/1976 | Kirschmann | 203/10 |
| 4,052,267 | 10/1977 | McFee | 203/10 |
| 4,081,331 | 3/1978 | Weiss | 202/83 |
| 4,269,663 | 5/1981 | McFee | 203/10 |
| 4,339,307 | 7/1982 | Ellis, Jr. | 203/10 |
| 4,342,623 | 8/1982 | Loeffler | 202/83 |
| 4,601,789 | 7/1986 | Bjorklund | 203/10 |
| 4,622,102 | 11/1986 | Diebel | 203/10 |
| 4,724,048 | 2/1988 | Helmich | 202/176 |
| 4,805,692 | 2/1989 | Palmer et al. | 203/10 |
| 4,818,344 | 4/1989 | Glucksman | 202/176 |
| 4,861,435 | 8/1989 | Sweet, Jr. | 203/10 |

FOREIGN PATENT DOCUMENTS

| | | | |
|---|---|---|---|
| 0107322 | 5/1984 | European Pat. Off. | 203/10 |
| 3108371 | 9/1982 | Fed. Rep. of Germany | 219/314 |

Primary Examiner—Virginia Manoharan
Attorney, Agent, or Firm—Rogers & Killeen

[57] ABSTRACT

A water distiller for vaporizing and condensing water. The distiller is provided with a container for holding the water to be distilled and a water level regulator for maintaining the water in the container at a desired level. A heating element is provided that is positioned just below the desired water level and spaced from the sides of the container. A cover is positioned atop the container for sealing the container and for suspending the heating element into the water. A condenser on top of the cover condenses vapor produced by the heating element. The distiller may be equipped with a sensor for sensing the temperature of the air above water level in the container and a shut off switch for removing power from the heating element responsive to a high temperature reading in the sensor.

16 Claims, 2 Drawing Sheets

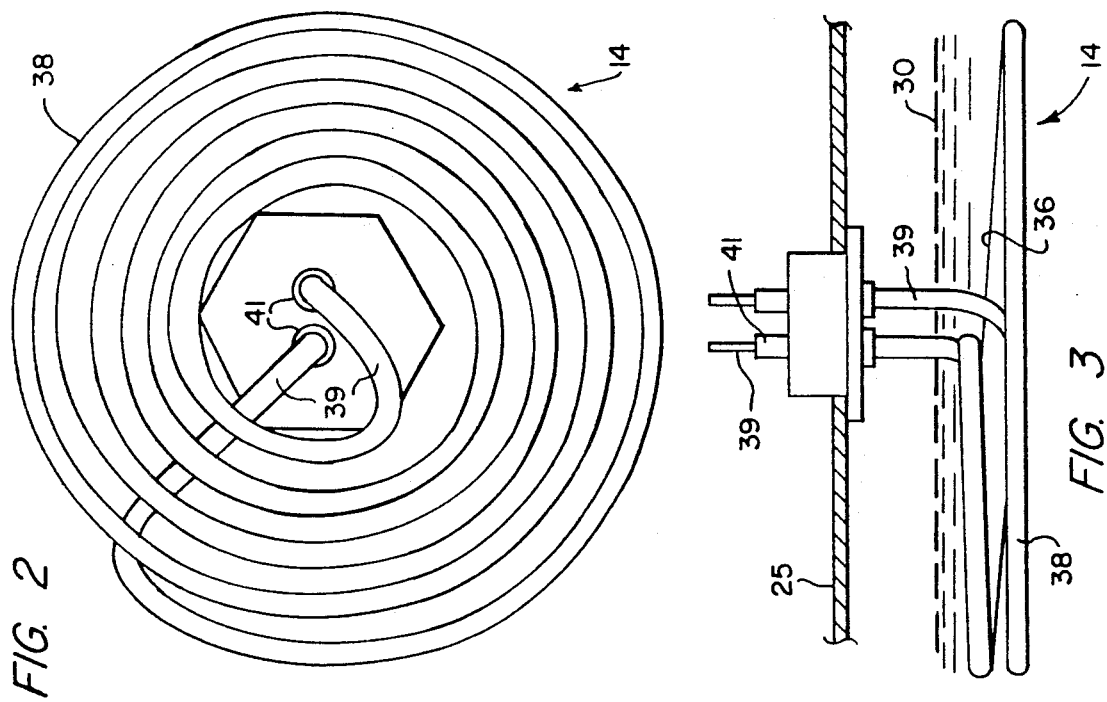
FIG. 2
FIG. 3
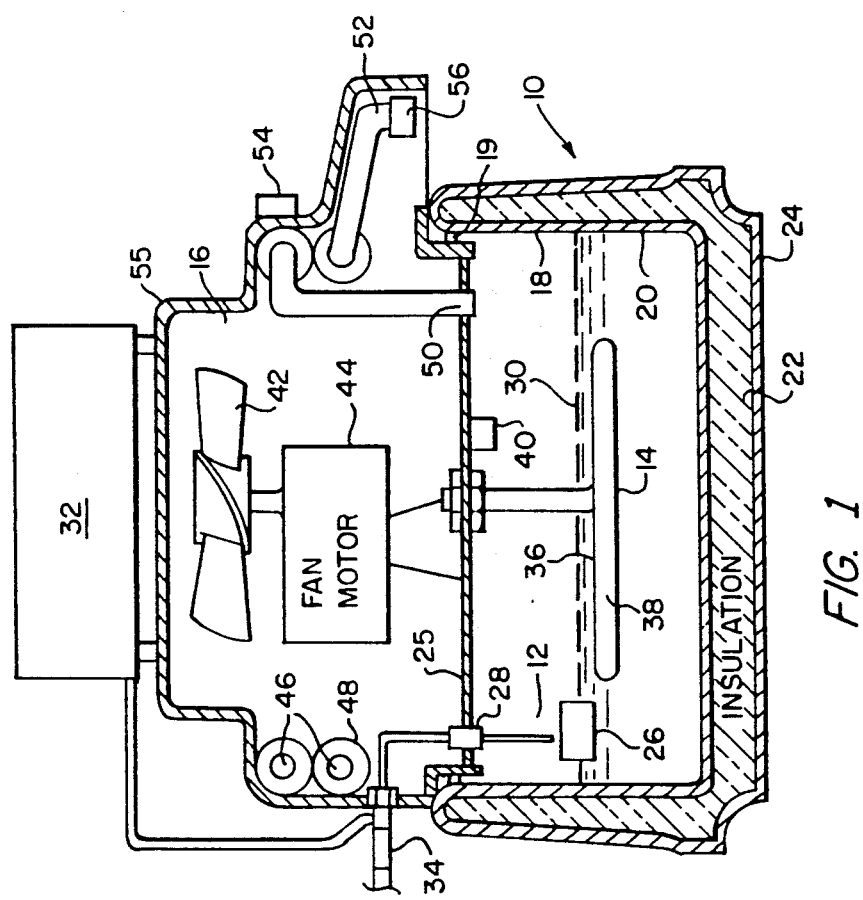
FIG. 1

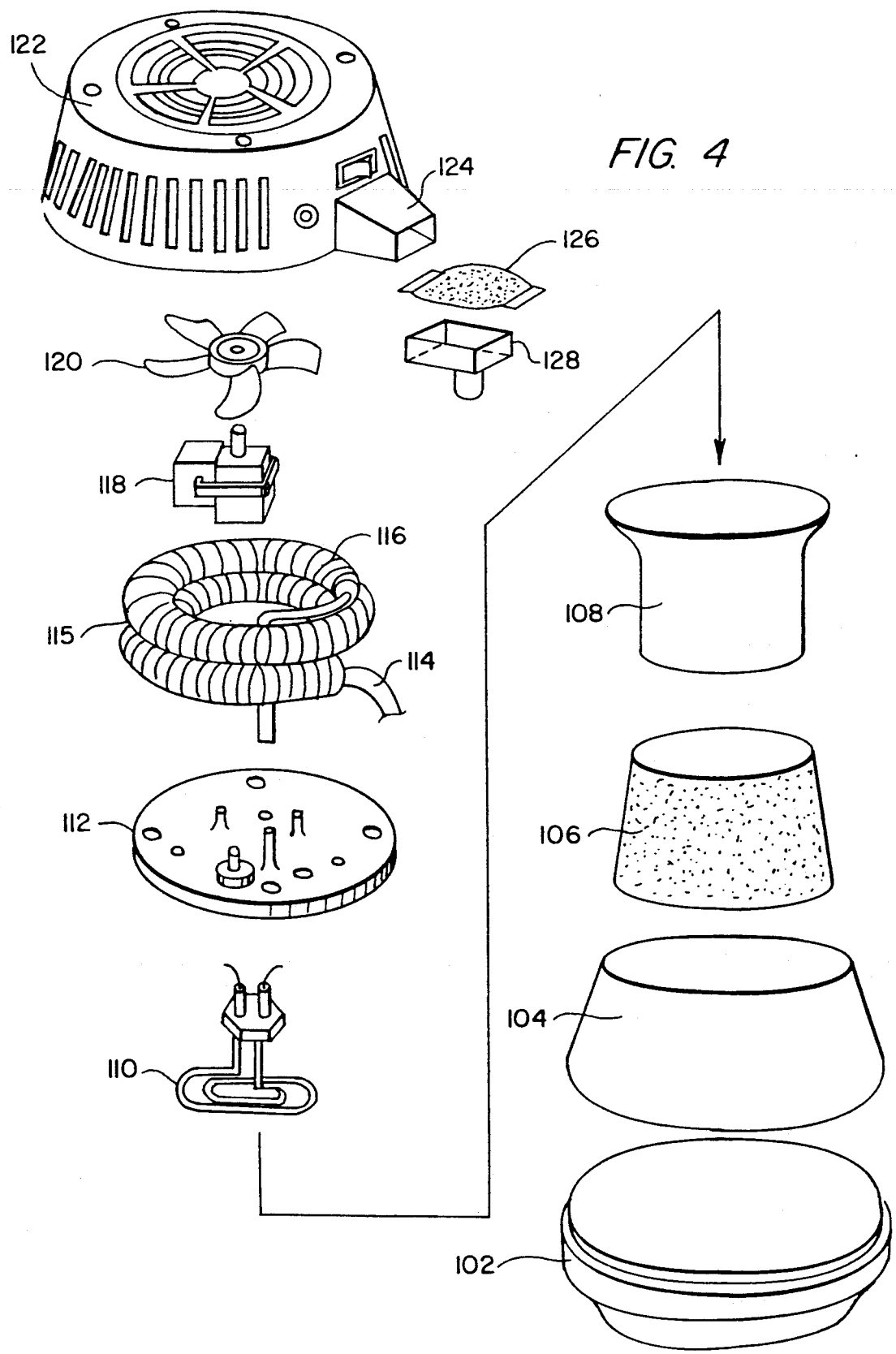

PORTABLE WATER DISTILLER

BACKGROUND OF THE INVENTION

The present invention relates to water distillation devices and more particularly to portable units for distilling water in the home using standard household electrical current.

Drinking water available in the home usually contains undesirable contaminants. Various approaches for removing these contaminants have been proposed. Typically, the contaminated water is heated in a closed chamber and vaporized. The hot vapor contains the purified water without the contaminants, which are deposited in the chamber. The vapor is collected and liquified in a cooling condenser to produce clean drinking water. See, for example, U.S. Pat. No. 4,818,344 to Glucksman, dated Apr. 4, 1989 and U.S. Pat. No. 4,342,623 to Loeffler, dated Aug. 3, 1982.

It is desirable that home distillers be energy efficient and easy to maintain. These desires present conflicting options, however, when trying to provide an efficient and easy to clean heating element for the vaporization chamber.

To be energy efficient, the heating element may be placed directly in the water to be vaporized. However, the element is quickly coated with contaminants because of the element's high operating temperature. Complicated maintenance and cleaning procedures to remove the scale of contaminants are usually required. See, for example, Glucksman supra and U.S. Pat. No. 4,612,090 to Ellis, Jr., dated Sept. 16, 1986.

To solve the problem of contaminant scaling, the heating element is often removed from contact with the water to be vaporized by placing it in the vaporization chamber floor. However, the element, because it must heat all the water in the chamber before producing a vapor, is then less energy efficient. See, for example, Loeffler supra, U.S. Pat. No. 4,342,625 to Dennison, dated Aug. 3, 1982, and U.S. Pat. No. 4,081,331 to Weiss, dated Mar. 28, 1978.

The present invention includes a heating element placed directly into the water to be vaporized. In contrast to the prior art, contaminant scaling on the heating element is significantly reduced and the energy efficiency improved by suspending the heating element horizontally just below the water surface level and reducing the element's operating temperature. Because the element is only required to vaporize the thin layer of water above the element, it can operate at a temperature just high enough to vaporize a small amount of water quickly, without heating all of the water in the chamber. A water level regulator maintains the desired water level. A temperature sensor and cut-off switch for the heating element may be provided to prevent overheating due to low water level. The heating element is suspended into the chamber from a removable top which may be displaced by overpressure in the chamber. The top includes all working parts of the distiller, including a condenser operated with household electrical current and control functions. The vaporization chamber may be resistant to scaling and removable for cleaning.

Accordingly, it is an object of the present invention to obviate many of the problems of the prior art and to provide a novel distiller which is energy efficient and easy to clean and maintain.

It is a further object of the present invention to provide a novel distiller in which the heating element heats only a thin layer of water above it with a relatively low temperature to slow the rate of deposit of contaminant material on the heating element.

It is yet another object of the present invention to provide a novel distiller in which the heating element operates at increased efficiency just below the surface of the water to be distilled.

It is still another object of the present invention to provide a novel method for distilling water in which efficiency is improved by suspending the heating element just below the water surface.

These and many other objects and advantages will be readily apparent to one skilled in the art to which the invention pertains from a perusal of the claims, the appended drawings, and the following detailed description of preferred embodiments.

BRIEF DESCRIPTION OF THE DRAWINGS

FIG. 1 is a partial pictorial representation of a cross section of an embodiment of the distiller of the present invention.

FIG. 2 is a pictorial representation of a top view of a heating element for the distiller of the present invention.

FIG. 3 is a side view of a pictorial representation of a heating element of FIG. 2.

FIG. 4 is an exploded pictorial representation of an embodiment of the distiller of the present invention.

DETAILED DESCRIPTION OF PREFERRED EMBODIMENTS

With reference to the figures where like elements have been given like numerical designations to facilitate an understanding of the present invention and particularly with reference to the embodiment of the distiller of the present invention illustrated in FIG. 1, the distiller may be constructed of container 10, a water level regulator 12, a heating element 14, and a condenser 16.

The container 10 may take any suitable shape for containing water and have interior water containing surfaces 18 that may be resistant to contaminate deposit (e.g., TEFLON) to facilitate cleaning of the interior surfaces of the container. The container 10 may be surrounded by insulation 22 and have an outer sleeve 24 for protecting the insulation. A cover 25 may be provided for sealably covering the container and maintaining the vapor inside the container. It is desirable that the container 10 and cover 25 be able to withstand operating temperatures up to about 450° F. without deforming and to this end it is preferred that they be made of the high temperature, high performance plastic such as CELCON. The cover may be held in place with seals 19 exerting pressure against the container and the cover. The pressure holding the cover in place should be set so as to allow the cover 25 to be unseated from the container 10 when the pressure in the container exceeds a predetermined level.

The water level regulator 12 may be of any known design but it is preferred that it include a float control system having a float 26 and a float activated valve 28 for maintaining the water level in the container 10 at a predetermined desired level 30. The float 26 and the valve 28 may be carried by the cover 25 so that they are separated from the container 10 when the cover is removed.

Water may be supplied to the container by gravity feed from a reservoir 32 or from a high pressure water supply received through water pressure regulator 34.

The reservoir 32 may be mounted above the cover 25 and be removable. Water may enter the container 10 through the cover 25.

The heating element 14 may be suspended from cover 25 into the container 10. It may be spaced apart from the container's sides and bottom and below the desired water level 30. The upper surface 36 of the heating element is desirably placed as close to the desired water level as possible while maintaining a minimum level of water above the upper surface 36. The maximum distance from the desired water level 30 to the upper surface 36 of the heating element should be approximately one half of an inch. It is preferred that the distance be one eighth of an inch, although as little as one-sixteenth of an inch is acceptable. The water between the heating element 14 and the water containing surfaces of the container provides insulation (it does not exceed 212° F.) and may have a depth of as little as approximately three-quarters of an inch. The heating element 14 may include a coil 38 that vaporizes the water to be distilled in the thin layer above it in approximately five minutes when powered with 900 watts at 115 volts AC.

As seen in FIGS. 2 and 3, the heating element 14 may include a stainless-steel coiled tube 38 carrying a heating wire 39. The wire 39 may proceed through the tube 38 in a single direction and pass through the cover 25 at two ports 41. A single port 41 and a folded wire 39 in the tube 38 may be provided, although this has been found to be less energy efficient. The heating element 14 may also be INCELOY.

With reference again to FIG. 1, the container 10 may also include a sensor 40 for sensing the temperature of the air above the desired water level 30 in the container 10. When the water level in the container drops below the desired level and exposes the heating element 14, the temperature sensor senses the rise in air temperature and turns off the heating element 14. The sensor 40 is preferably carried by the cover located immediately above the heating element 14. It may be set to turn off the heating element when the temperature of the air reaches 240° F.

The condenser 16 is mounted atop the cover 25 and may include a fan 42 driven by motor 44 and condensing coil 46 with multiple fins 48 for cooling the vapor in the coils. The vapor from the container enters the condensing coil through inlet port 50 and is condensed in the coil and exits at spout 52. The effectiveness of the condenser is determined primarily by the coil length, fin size and spacing, and fan effectiveness. To this end, the condensing coil 46 may be three-eighths inch stainless-steel tubing having a length of approximately fifty inches. The fins 48 may be about one inch in diameter and bonded to the coil 46 with about eight fins per inch of coil by a process suggested by Cain Industries of Germantown, Wis. A second cover 55 to protect the condenser may also be provided. The second cover may be vented to allow the fan to circulate air over the condenser. Water exiting the coils through the spout may pass through a filter 56, such as charcoal.

Power for the heating element 14 and the fan motor 44 may be provided through an on-off switch 54 and is desirably standard household current, such as 115 volts AC.

FIG. 4 is an exploded pictorial representation of another embodiment of the present invention. It may include a base 102 for supporting the distiller, an outer sleeve 104 for protecting the interior of the distiller, an insulative layer 106 inside the sleeve, and a vaporization chamber 108 which fits inside the insulative layer. The heating element 110 is suspended from a cover 112 into the vaporization chamber 108. The condenser 115, including coil 114 and multiple fins 116, sets atop the cover 112. A motor 118 for the fan 120 may be disposed inside the coil 114. The condenser, fan, and motor may be covered by a protective cover 122 which is attached to cover 112. The spout 124 of the cover 122 may include a charcoal filter 126 and a dispensing spout 128.

While preferred embodiments of the present invention have been described, it is to be understood that the embodiments described are illustrative only and that the scope of the invention is to be defined solely by the appended claims when accorded a full range of equivalence, many variations and modifications naturally occurring to those skilled in the art from a perusal hereof.

I claim:

1. A water distiller for vaporizing and condensing water comprising:
   (a) a container for holding water to be distilled;
   (b) water level regulation means for maintaining water in said container at a desired level;
   (c) a heating element horizontally disposed below said desired water level and spaced apart from said container for vaporizing water to be distilled, said heating element having an upper heated portion between approximately one-sixteenth and one-half inch from said desired water level,
   said heating element including means for heating the heating element only to a temperature sufficient to vaporize the water between said heating element and said desired water level in about five minutes;
   (d) a cover disposed atop said container for carrying said heating element and for sealably covering said container; and
   (e) a condenser carried by said cover for condensing water vaporized by said heating element,
   whereby the water heater is able to operate at a temperature that reduces scaling and thereby improves the efficiency of said distiller.

2. The distiller as defined in claim 1 wherein said upper heated portion is between one-eighth and one-quarter inch below said desired water level.

3. The distiller as defined in claim 2 wherein said heating element comprises a coil that vaporizes water between said upper heated portion and said desired water level in approximately five minutes when receiving 900 watts of power at 115 volts AC.

4. The distiller as defined in claim 3 further comprising a sensor for sensing the temperature of the air in said container and a cut-off switch responsive to said sensor for removing power from said heating element when said sensor senses a temperature above a predetermined level.

5. The distiller as defined in claim 4 wherein said predetermined temperature level is approximately 240° F.

6. The distiller as defined in claim 5 wherein said container comprises a plastic able to withstand temperatures up to about 450° F. without deforming.

7. The distiller as defined in claim 1 wherein said water level regulation means comprises a float activated valve.

8. The distiller as defined in claim 1 wherein said condenser comprises a tubular coil with fins for cooling water vapor in said tubular coil.

9. The distiller as defined in claim 1 wherein said container comprises a water containing inner surface that is resistant to adhesion of evaporation by-products.

10. The distiller as defined in claim 1 wherein said heating element comprises a coiled tube carrying a heating wire in one direction through said tube.

11. A method for improving the efficiency of a distiller comprising the steps of:
   (a) horizontally disposing a heating element between about one-sixteenth and one-half inch below a desired water level in a chamber for vaporizing water, the heating element being spaced from the chamber's water containing sides by at least three-quarters inch;
   (b) suspending said heating element from a removable cover disposed atop of the chamber; and
   (c) heating the heating element only to a temperature sufficient to vaporize the water between the heating element and the desired water level in about 5 minutes, whereby scaling may be reduced and the efficiency of the distiller improved.

12. The method as defined in claim 11 wherein the step of heating the heating element further comprises the step of applying about 900 watts of power at 115 volts AC to the heating element.

13. The method as defined in claim 11 wherein the heating element is disposed between about one-eighth and one-quarter inch below the desired water level.

14. The method as defined in claim 11 further comprising the steps of sensing the temperature of the air in the chamber and not heating the heating element when the sensed temperature exceeds a predetermined level.

15. The method as defined in claim 11 further comprising the step of maintaining the desired water level with a float activated water shut-off valve.

16. The method as defined in claim 11 further comprising the step of displacing the removable cover when the pressure in the chamber exceeds a predetermined amount.

* * * * *